United States Patent [19]
Spector et al.

[11] 3,843,789
[45] Oct. 22, 1974

[54] REMOVAL OF SULFUR OXIDES FROM STACK GAS

[75] Inventors: Marshall L. Spector, Belle Mead, N.J.; P. L. Thibaut Brian, Allentown, Pa.

[73] Assignee: Air Products and Chemicals, Inc., Wayne, Pa.

[22] Filed: Feb. 26, 1973

[21] Appl. No.: 335,523

[52] U.S. Cl. ............................................. 423/242
[51] Int. Cl. ........................................ C01b 11/00
[58] Field of Search ......................... 423/242, 243

[56] References Cited
UNITED STATES PATENTS

| | | | |
|---|---|---|---|
| 1,496,410 | 6/1924 | Doremus et al. | 423/242 |
| 1,931,408 | 10/1933 | Hodsman et al. | 423/242 |
| 2,676,090 | 4/1954 | Johnstone | 423/242 |
| 3,645,671 | 2/1972 | Griffin et al. | 423/242 |

Primary Examiner—Oscar R. Vertiz
Assistant Examiner—Gregory A. Heller
Attorney, Agent, or Firm—Bernard M. Weiss; Richard A. Dannells, Jr.; Barry Moyerman

[57] ABSTRACT

The plume of particulate matter emitted in the vapor effluent from ammoniacal scrubbing of sulfur dioxide from flue gases is prevented or eliminated by maintaining controlled operating conditions.

10 Claims, 3 Drawing Figures

REMOVAL OF SULFUR OXIDES FROM STACK GAS

BACKGROUND OF THE INVENTION

Sulfur oxides are regarded as being among the most harmful of the known air pollutants. To meet the challenge presented by government regulations restricting the emission of sulfur oxides into the atmosphere a number of suggested widely varying processes have been advanced. Resort to the use of naturally occurring low sulfur fuels is limited by their availability and increased cost. While techniques for desulfurization of fuels containing higher than tolerable limits of sulfur have been developed, present projections indicate that the added costs would impose an excessive economic burden, besides which the desired extent of removal of sulfur by hydrodesulfurization of coal or of available crude oils or residual oils of fairly high sulfur levels has not been satisfactorily demonstrated.

Alternative routes to solving the problem of atmospheric pollution by sulfur oxide emission which have been extensively investigated, involve the removal of these noxious components from the stack gases. Many and various processes have been proposed and some investigated on a large scale. Among the most promising are those methods utilizing wet scrubbing of the stack gas. Among the latter, scrubbing of the stack gas with aqueous ammoniacal solutions, is presently regarded as one of the simplest and most economical ways of getting the sulfur oxides out of the stack gas, particularly when coupled with the offset of operating costs by the recovery of useful products from the absorbed sulfur compounds contained in the loaded scrubbing liquid.

Many and varied modifications have been described in the literature relating to the scrubbing of stack gases with aqueous ammoniacal solutions. These processes have been studied by the Tennessee Valley Authority (TVA) for the National Air Pollution Control Administration (NAPCA) and a Report issued thereon in October, 1970 under the title: SULFUR OXIDE REMOVAL FROM POWER PLANT STACK GAS; Conceptual Design and Cost Study Series, Study No. 3; *Ammonia Scrubbing* (Bulletin Y-13). This Report contains an extensive bibliography abstracting most of the important literature references on the subject. The described processes can be divided into two general categories: (1) those in which the products formed by reaction of the sulfur oxides with the ammoniacal scrubbing liquid are recovered as ammonium compounds proposed for use in fertilizers or other industrial applications — so called "non-regenerative" processes, as distinguished from (2) regenerative processes in which the formed ammonium-sulfur oxide reaction products are decomposed or stripped, obtaining ammonia for recycle to the scrubber; the residual sulfur-containing compounds being recovered by conversion to industrially useful products. While not limited thereto, the present invention is more particularly concerned with such regenerative processes in which the loaded scrub liquor is treated to recover the sulfur values therein while the ammonia is recycled for use in the scrubbing operation.

The known processes, which have been extensively described in the literature, and which have been carried out in large scale pilot plant demonstrations (and to some extent commercially), are chiefly concerned with stationary power plant installations burning coal or petroleum oils of fairly high sulfur content and emitting vapor combustion products containing generally less than ½% $SO_2$ with various amounts of dust and water vapor. In the typical operation proposed for cleaning up the stack gas by wet scrubbing, the flue gas is first treated to remove most of the particulate matter and then contacted in the scrubber with the aqueous ammoniacal scrubbing liquid. Ammonia introduced into the scrubber liquor can react with the $SO_2$ dissolved in the liquid phase to produce ammonium sulfite by the following reaction:

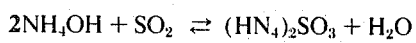

$$2NH_4OH + SO_2 \rightleftarrows (NH_4)_2SO_3 + H_2O \quad (A)$$

All of part of the ammonium sulfite formed can absorb additional $SO_2$ to form ammonium bisulfite in accordance with the equation:

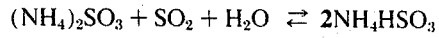

$$(NH_4)_2SO_3 + SO_2 + H_2O \rightleftarrows 2NH_4HSO_3 \quad (B)$$

The scrubber effluent in addition to sulfite and ammonia values will also contain ammonium sulfate as a result of oxidation of $SO_2$ or the presence of $SO_3$ in the flue gas. The presence of sulfate does not interfere with the operation according to the present invention.

The liquid purged from the scrubber can be treated by any one of a number of known methods depending upon whether the ammonia is to be recycled or recovered in the product, while the $SO_2$-freed flue gas is discharged through the stack. If ammonia is to be recycled to the scrubber, the liquid effluent from the scrubber is subjected to a decomposition or stripping operation producing a stream of ammonia and sulfur dioxide. The latter can be converted to sulfuric acid or elemental sulfur, while the ammonia is freed for reuse in the scrubber.

THE PROBLEM

In operation of the ammonia scrubbing process as above described, it has been observed at times than an unsightly plume of particulate matter appears in the discharge gas emitted from the stack. While this plume has been observed and reported in the literature, no satisfactory explanation for its presence has heretofore been offered nor has there been advanced any means for overcoming this undesirable occurrence.

SUMMARY OF THE INVENTION

It has now been found that the appearance of the plume in the stack gas discharge from the ammoniacal scrubbing of $SO_2$-containing flue gases can be largely or wholly prevented or eliminated by the control of operating conditions in the scrubber. It has been established, in accordance with the present invention, that if the product of the partial pressures of water vapor, sulfur dioxide and ammonia is below a certain critical value expressed as a function of the operating temperature, the plume does not appear. The critical limits, based on plottings of repeated experimental data, can be expressed in terms of the logarithm of the product of the partial pressures of water vapor, sulfur dioxide and ammonia (each in millimeters of mercury) as a function of the absolute temperature, thus:

$$\log_{10} [pNH_3]^r \times [pSO_2]^q \times [pH_2O]^n = m(1/T) + b$$

(C)

in which T is the absolute temperature in degrees Rankine and $m$ and $b$ are constants derived from experimental data as will herein after appear. The exponents $r$, $q$ and $n$ represent respectively the number of mols of the reacting component in accordance with one or another of the equilibrium equations for the decomposition of the four solid phases which may form:

Ammonium sulfite: $r = 2$, $q = n = 1$ $$(NH_4)_2SO_{3(s)} \xrightleftharpoons{K_I} 2NH_3 + SO_2 + H_2O$$

(I)

Ammonium bisulfite: $r = q = n = 1$ $$NH_4HSO_{3(s)} \xrightleftharpoons{K_{II}} NH_3 + SO_2 + H_2O$$

(II)

Ammonium sulfite monohydrate: $r = n = 2$, $q = 1$ $$(NH_4)_2SO_{3(s)} \cdot H_2O \xrightleftharpoons{K_{III}} 2NH_3 + SO_2 + 2H_2O$$

(III)

Ammonium pyrosulfite: $r = q = 2$, $n = 1$ $$(NH_4)_2S_2O_{5(s)} \xrightleftharpoons{K_{IV}} 2NH_3 + 2SO_2 + H_2O$$

(IV)

DESCRIPTION OF PREFERRED EMBODIMENTS OF THE INVENTION

Figure 3:
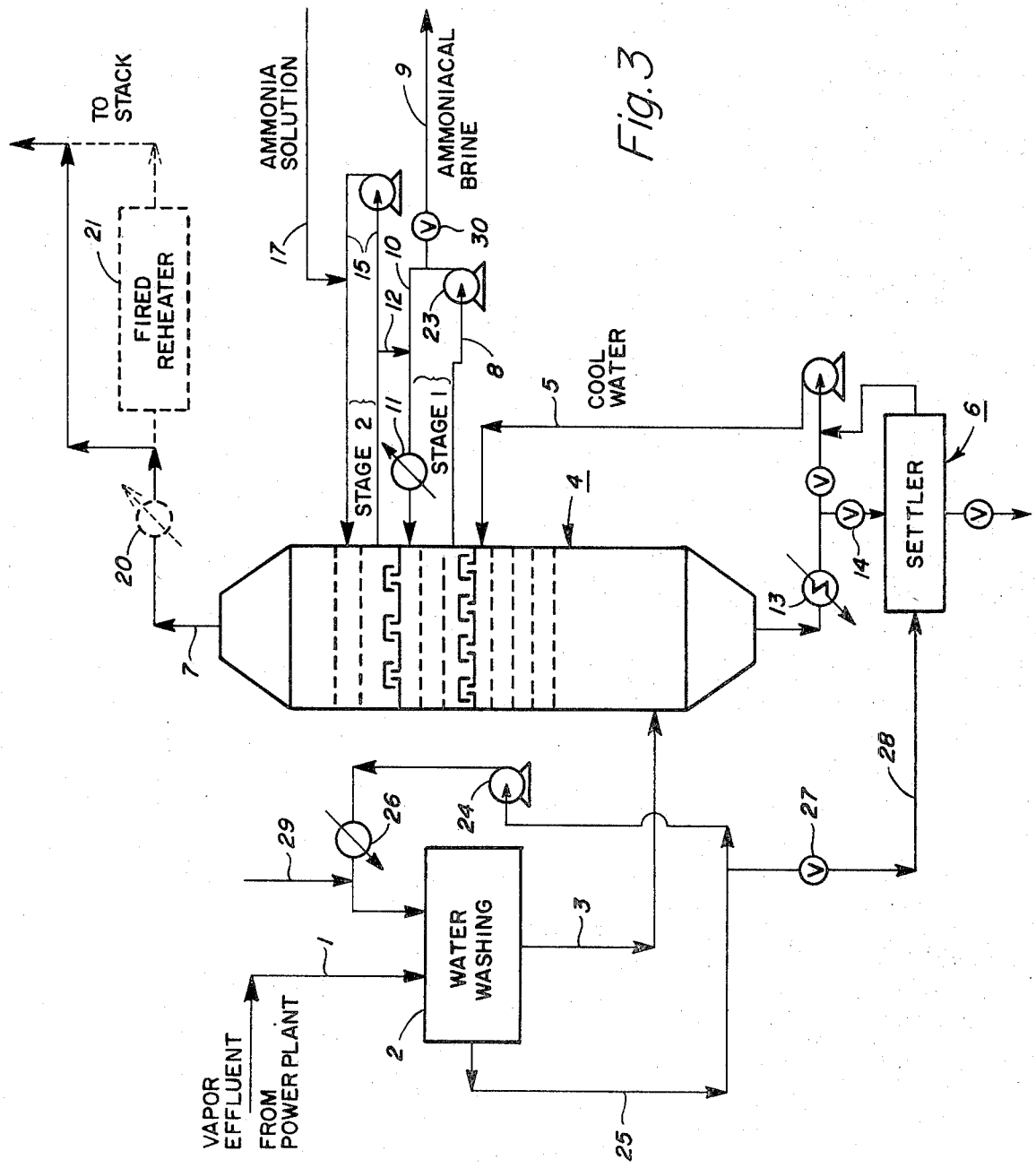
FIG. 3 is a schematic flow diagram illustrating one embodiment of a typical system in which the invention may be practiced.

The flow diagram in FIG. 3, illustrates a system for removal of $SO_2$ from the combustion products of sulfur-containing fuel employed for example in a power generating plant boiler, or from other industrial waste gases containing sulfur dioxide. The vapor effluent will generally contain particulate matter (in large measure when coal is being used), oxides of carbon, oxides of nitrogen, oxides of sulfur, residual oxygen and nitrogen, and water vapor. Where chloride-containing coal is used as fuel, the flue gas may contain HCl. To remove the particulate matter and thus avoid their prohibited excessive emission into the atmosphere, most modern plants employ electrostatic precipitators, while many of the older plants are equipped only with mechanical dust collectors. In the illustrated system, provision is made for scrubbing the dust-laden combustion gases with water, with accompanying cooling of these gases prior to contact with the ammoniacal absorbent liquor. The vapor effluent leaving the power plant boiler, whether or not solid particulate matter has been already separated therefrom by electrostatic precipitation or mechanical collectors, is usually cooled by heat exchange with incoming atmospheric air entering the boiler. Additional cooling may be effected by further exchange with cooler process streams from downstream of the scrubber. In the preferred operation, and particularly for new installations or existing installations in which substantially complete removal of dust from the combustion products is not obtained, wet scrubbing of the gases with water is advised to remove at least most of any remaining fly ash therein and reduce the concentration of HCl to less than 10 ppm. While not limited to any particular type of equipment, the use of a venturi type scrubber is preferred for this operation. In any event it is desirable to remove as much of the hydrogen chloride and dust as possible by wet scrubbing, electrostatic precipitation or otherwise, prior to introduction of the gas into the absorber column ($SO_2$ scrubber), to prevent excessive solids concentration and formation of particulate ammonium chloride in the subsequent scrubbing operation. By washing of the gases with water, these are further cooled to a temperature of about from 130° to 150°F and saturated with water.

Referring now to FIG. 3 of the drawing, the vapor effluent 1 from the power plant, in preferred operation, is water washed and cooled as indicated at 2, and directed by line 3 into the absorption column or $SO_2$ scrubber 4, at the lower section thereof. Here the gases come into direct contact with a down-flowing stream of water which effects cooling of the counter-currently flowing gas stream to a temperature preferably lower than that of the initial ammoniacal scrubbing stage and in the order of from 90° to 130°F. This operation will also remove any residual small amounts of solid particles or hydrogen chloride that might still be present in the gas.

The system shown provides for recirculating the water slurry to the water washing zone 2 via pump 24, line 25 and cooling device 26, which latter may be either of the direct or indirect type. Fresh wash water is added via line 29, and liquid is purged from the system via valve 27 and line 28. If the alkali concentration of the fly ash is insufficient to neutralize the contained HCl, it may be desirable to add additional base.

In the illustrated embodiment additional water cooling and washing of the gas is effected in the lowermost section of absorber 4 with the water being circulated in a loop 5 and provision being made for further cooling as indicated at 13 and for removal of slurry via valve 14 to the settling zone indicated at 6.

The flue gas, in its upward ascent through absorber 4, after leaving the water cooling zone in the lowermost section of the absorber, then passes into several stages of treatment with aqueous ammoniacal liquor. As hereinabove indicated, while the initial treating agent fed or recycled to the absorber 4 is predominantly aqueous ammonia, ammonium sulfite is formed prior to its introduction into the scrubber as exemplified by:

$$NH_4HSO_3 + NH_3 \rightarrow (NH_4)_2SO_3$$

(D)

In the illustrated embodiment two stages of treatment with the ammoniacal liquid are indicated but it will be understood that the operation need not be limited to this number. The ascending $SO_2$-containing gas in the first stage of absorption contacts the descending liquor which already contains ammonium bisulfite and ammonium sulfite, continues its ascent through the succeeding stages of $SO_2$ absorption thereabove to discharge from the uppermost stage as indicated at 7. In each successively higher stage of the treatment the molar ratio of ammonia to $SO_2$ in the liquid is maintained and adjusted independently. From the lowermost asorption stage the ammoniacal brine rich in combined sulfur is discharged through line 8 and recycled to the system via pump 23 and line 10, a minor portion thereof being purged under control of valve 30, through line 9 to a products-recovery section (not shown). The major portion of the discharged ammoniacal brine is recirculated to the lowermost treating stage through line 10 and heat exchanger 11.

While in the illustrated embodiment two stages of water washing and cooling are shown, it will be understood that in many instances a single stage may be sufficient and that three or more stages can be employed, if desired or required, all within the scope and spirit of the present invention. Also included in the treating liquid charged to the first absorption stage is a part of the liquid withdrawal from the recycling liquor in the next higher treating stage, as shown by line 12.

The initial ammonia solution enters through line 17 and joins the liquor in line 15 recirculating through the uppermost stage in the scrubber. In regenerative systems, as above explained, this ammonia solution comes from the products-recovery section (not shown). In each of the intermediate treating stages the liquor is individually recycled, with provision being made for withdrawal of a portion of the liquor recycling in such stage for discharge into other stages as required.

As thus far described, the flue gas entering the absorber 4 is subjected to cooling and washing with water and then to successive stages of treatment for absorption of $SO_2$ therefrom, essentially with mixtures of aqueous ammonium sulfite and aqueous ammonium bisulfite, the use of which, instead of aqueous ammonia, decreases the partial pressure of ammonia in the vapor phase. The absorbent solution flows down through the absorber counter-current to the ascending gas, and the liquid effluent is withdrawn from the bottom stage. The residual gas discharge at 7 from the uppermost zone of the scrubber typically will contain no greater than about 200 to 300 ppm of oxides of sulfur. This represents about a 90 percent sulfur removal from a flue gas obtained on burning a fuel containing 3 percent sulfur.

Any of the various known types of contacting columns, designed for multi-stage operation may be employed for the scrubbing operation in practice of the features of the invention. Thus, there comes into consideration packed abosrbers, venturi scrubbers, as well as those employing multi-stages of bubble cap plates on perforated plates or sieve trays with or without downcomers. In any instance the operating conditions at each stage of the absorption must be controlled to prevent occurrence of the undesired plume in the residual gas discharged into the stack or from the stack into the atmosphere.

A suggested and desirable practice is the provision of means for reheating the cool vapor effluent discharged through line 7. While it was generally believed that with a high degree of $SO_2$ removal (80 percent or more) the flue gas temperature was not important, the heating step was considered desirable from the standpoint of improving the buoyancy or thermal lift of the gas plume leaving the stack; otherwise it was expected that the plume might sooner come back to the ground, without the normal degree of dilution by ambient air. As a result, the presence of nitrogen oxides in the insufficiently diluted gases returning to ground level, would increase the pollution problem. While this reheating step would significantly increase installation and/or operating costs, it was regarded as a desirable precaution to prevent high ground-level concentrations particularly during upset conditions in the scrubber or the occurrence of abnormal atmospheric conditions above the stack. While the desirability of the reheating step has been generally accepted, the required level of reheat has not been established.

Accordingly, as shown in FIG. 3, provision is made for reheating of the exit gas from line 7. This may be accomplished by heat exchange with other hot process streams as indicated at 20, or by a direct fuel-fired in-line heater 21, used alone or supplementing the heat exchanger at 20, depending upon size of the installation and economics of installation costs versus operating fuel costs.

In practice of the features of the invention, as will hereinafter appear, the operating conditions established for the absorber will be such that the generation of a plume is ordinarily avoided. Provision for reheating of the exit gas may nevertheless be desirable to take care of situations when upset in operation may effect a departure from the design parameters, and the added heat may cause better dissipation of the flue gas as a result of increased buoyancy. Since it is expected that the plume will be generated only infrequently, if at all, when operating within the prescribed conditions of the invention, reheating of the exit gas by an in-line heater 21 may be limited to intermittent periods of upset, or may be limited in required extent of sensible heat input by use of a relatively smaller heat exchanger at 20, with consequent savings in operation or installation costs.

Noting the appearance of the plume on frequent occasions and not at others, the present investigation was conducted with the object of determining the causes of such plume formation and possible means for its prevention. Early in the experimental program it was noted that by mixing in air a gas stream containing 0.24% $SO_2$ with one containing 0.31% $NH_2$, a fine white particulate matter was formed. When water vapor was added to this mixture the precipitate formed at lower concentrations of $SO_2$ and $NH_3$ than with $SO_2$ and $NH_3$ in the absence of the added water vapor. Based on these observations, an experimental program was initiated to determine whether or not there were controllable critical conditions leading to the formation of the observed plume. In the course of this investigation, a series of runs were carried out with a nitrogen-diluted gas mixture of constant $NH_3:SO_2$ ratio but varying the $H_2O$ partial pressure. It was found there was a critical temperature at which the plume appeared or disappeared. Within a temperature variation of approximately from 1° to 30°F from a mean the plume could be produced or destroyed. Further runs were then made, varying the $SO_2:NH_3$ ratios and at different levels of $H_2O$ addition. Here again it was found that the temperature at which the production of the plume oc-

TABLE 2

| Exp. No. | $K_{II}$ $[pNH_3] \times [pSO_2] \times [pH_2O]$ (NH$_4$HSO$_3$) | $K_I$ $[pNH_3]^2 \times [pSO_2] \times [pH_2O]$ (NH$_4$)$_2$SO$_3$ | $K_{III}$ $[pNH_3] \times [pH_2O] \times \sqrt{pSO_2}$ (NH$_4$)$_2$SO$_3 \cdot$H$_2$O | $K_{IV}$ $[pNH_3] \times [pSO_2] \times \sqrt{pH_2O}$ (NH$_4$)$_2$S$_2$O$_5$ | Smoke Temp. °F |
|---|---|---|---|---|---|
| 1 | 223 | 446 | 120.5 | 39.1 | 134 |
| 2 | 65.5 | 131 | 35.4 | 21.2 | 123 |
| 3 | 120.3 | 240.6 | 62.2 | 28.7 | 130 |
| 4 | 32 | 25.9 | 17.3 | 9.41 | 119 |
| 5 | 904 | 6450 | 459 | 158.6 | 150.5 |
| 6 | 1777 | 12,690 | 902 | 222 | 152 | p = partial pressures in mm. Hg curred, varied with the partial pressures of SO$_2$, NH$_3$ and H$_2$O in the gas composition.

From further studies of the results obtained in the initial experimental program it was concluded that plume formation in the exit gas from scrubbing of flue gas with ammoniacal solutions is due to the formation of solid particulate matter in the gas phase in the scrubber. This precipitation of solid from the vapor phase will occur when the product of the partial pressures of water, ammonia and sulfur dioxide exceeds a critical value, which is a function of and varies with the temperature of the gas.

In our initial work it was assumed that the principal solid particles in the plume were composed of ammonium bisulfite formed in accordance with Equation B set out above, or as represented by the equilibrium equation:

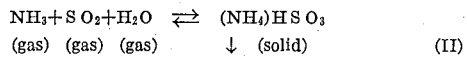

$$NH_3 + SO_2 + H_2O \rightleftarrows (NH_4)HSO_3$$
(gas) (gas) (gas) ↓ (solid)   (II)

For solid product to be formed in the vapor according to Equation II at any given temperature, the product of the partial pressures of the components NH$_3$, SO$_2$ and H$_2$O must exceed that required to drive the reaction to the right in Equation (II).

Figure 1:
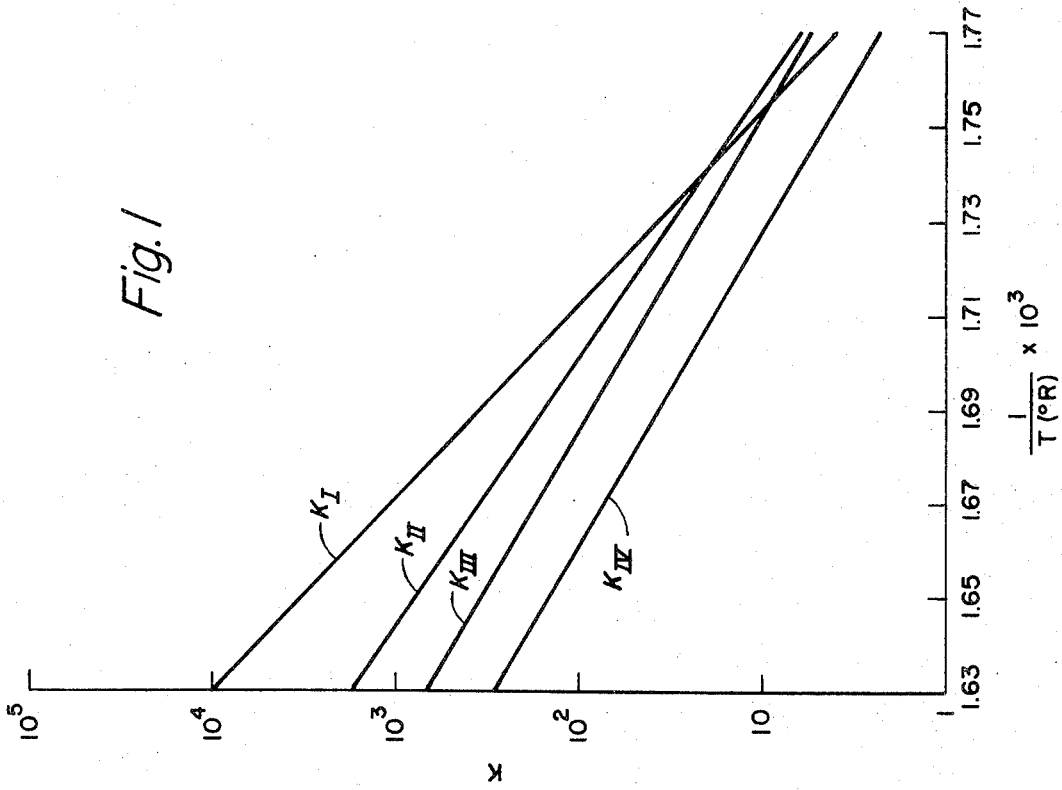
FIG. 1 is a graph based on experimental data, plotted on a semi-log scale and showing the critical relation between operating temperature and the product of the partial pressures of components of the vapor effluent governing the production of the plume.

Table 1 below tabulates the numerical data of the runs on which the graph in FIG. 1 is based, wherein NH$_3$ and SO$_2$ were mixed to obtain the partial pressures indicated and the partial pressure of water was controlled by running N$_2$ through a bubbler at controlled temperatures. the smoke temperature recorded is the mean of the range at which the appearance or disappearance of the plume occurred. Plotting this data with 1/T as abscissa and the product of the partial pressures as ordinates on semi log graph paper and using the method of least squares, substantially straight line curves were obtained having the mathematical relationship expressed in Equation C.

TABLE 1

| Exp. No. | pNH$_3$ Torr | pSO$_2$ Torr | pH$_2$O Torr | Smokepoint °F |
|---|---|---|---|---|
| 1 | 2.0 | 3.42 | 32.6 | 134 |
| 2 | 2.0 | 3.42 | 9.57 | 123 |
| 3 | 2.0 | 3.42 | 17.6 | 130 |
| 4 | 0.81 | 3.42 | 11.56 | 119 |
| 5 | 7.14 | 3.88 | 32.6 | 150.5 |
| 6 | 7.14 | 3.88 | 64.2 | 152 |

In obtained curves reproduced in FIG. 1 of the accompanying drawings, the Roman numerals indicate the particular equilibrium reactions respectively identified by the same Roman numerals, hereinabove. The K values in FIG. 1 are those defined below. Stated otherwise graph I to IV respectively are based on the experimental data of Table 1, with the products of the partial pressures of NH$_3$, SO$_2$ and H$_2$O as displayed in Table 2, thus:

$$(NH_4)_2 SO_3 \rightleftarrows 2NH_3 + SO_2 + H_2O$$
$$[pNH_3]^2 \times [pSO_2] \times [pH_2O] = K_I$$

(I)

(Anhydrous Diammonium Sulfite Solid)
The equation of this curve determined by conventional point slope method is $$\text{Log}_{10} K_I = (-24,300/T) + 43.6$$

In similar manner the corresponding values for the other curves in FIG. 1 are:

$$NH_4HSO_3 \rightleftarrows NH_3 + H_2O + SO_2$$
$$[pNH_3] \times [pH_2O] \times [pSO_2] = K_{II}$$
$$\text{Log}_{10} K_{II} = (-17,300/T) + 31.4$$

(II)

(Ammonium Bisulfite Solid)

$$\tfrac{1}{2}(NH_4)_2SO_3 \cdot H_2O \rightleftarrows NH_3 + H_2O + \tfrac{1}{2} SO_2$$
$$[pNH_3] \times [pH_2O] \times \sqrt{pSO_2} = K_{III}$$
$$\text{Log}_{10} K_{III} = (-14,900/T) + 27.1$$

(III)

(Diammonium Sulfite Monohydrate Solid)

$$\tfrac{1}{2}(NH_4)_2S_2O_5 \rightleftarrows NH_3 + SO_2 + \tfrac{1}{2} H_2O$$
$$[pNH_3] \times [pSO_2] \times \sqrt{pH_2O} = K_{IV}$$
$$\text{Log}_{10} K_{IV} = (-14,950/T) + 26.8$$

(IV)

(Ammonium Pyrosulfite Solid)

In order to determine which of the theoretically possible salts is formed when the plume is observed, a series of experiments were carried out within approximately the same temperature range while varying the NH$_3$/SO$_2$ ratio in the vapor at substantially constant water vapor content and by varying the water vapor content at constant NH$_3$/SO$_2$ ratio. The results of these runs are reported in Table 3 below.

TABLE 3

| Exper. | pNH$_3$ Torr | pSO$_2$ Torr | pH$_2$O Torr | Temp. Range °F Smoke Appear | Temp. Range °F Smoke Disappear |
|---|---|---|---|---|---|
| A | 0.164 | 4.55 | 70.5 | 119.5 | 126 |
| B | 0.149 | 4.64 | 70.1 | 119.5 | 122.5 |
| C | 1.46 | 0.569 | 69.0 | 123.5 | 129.5 |

TABLE 3-Continued

| Exper. | pNH₃ Torr | pSO₂ Torr | pH₂O Torr | Temp. Range °F Smoke | |
|---|---|---|---|---|---|
| | | | | Appear | Disappear |
| D | 1.50 | 4.64 | 7.0 | 122.5 | 127.5 |
| E | 0.37 | 2.40 | 72.3 | | 125 |

The equilibrium values obtained predicated upon the formation of the theoretically possible salts are reported in Table 4 below. Since the temperature range was essentially constant, the salt possessing the most constant K values is most likely to be the solid formed in the plume. It is emphasized that the K values cited above are not equilibrium values since substantial supersaturation is involved.

TABLE 4

| Exper. | $K_I$ $(NH_4)_2SO_3$ | $K_{II}$ $(NH_4)HSO_3$ | $K_{III}$ $(NH_4)_2SO_3 \cdot H_2O$ | $K_{IV}$ $(NH_4)_2S_2O_5$ |
|---|---|---|---|---|
| A | 8.63 | 52.6 | 24.7 | 6.27 |
| B | 7.22 | 48.5 | 22.6 | 7.25 |
| C | 83.6 | 57.3 | 76 | 6.9 |
| D | 73.1 | 48.7 | 22.7 | 18.4 |
| E | 23.8 | 64.2 | 41 | 7.5 |

By noticing the constancy of the K values and by comparing the obtained data with the equilibrium curves I to IV in FIG. 1 of the accompanying drawings, the observed results best fitted curve II, indicating that the solid in the plume was most likely ammonium bisulfite. Analysis of the solid collected from a plume confirmed that the $NH_3/SO_2$ mol ratio in the salt was approximately 1:1, which is consistent with either $NH_4HSO_3$ or $(NH_4)_2S_2O_5$. Since, however, the observed smoke points better fitted the equilibrium curve II rather than curve IV, it was concluded, without being bound thereby, that the salt formed in the plume was most likely $NH_4HSO_3$. Based on these considerations it was established that operation of the scrubber at conditions falling below curve II of FIG. 1 throughout the scrubber is necessary to avoid plume formation.

Fully to safeguard against the possibility of plume formation as a result of solids formation in the vapors within the scrubber, operation somewhat below curve II of FIG. 1 is recommended. Since some degree of experimental error is possible in the observed temperature at which the presence of solids (smoke) is initially noted and the range of about ± 3°F between the temperatures of the observed appearance and disappearance of the smoke, curve II of FIG. 1 is redrawn in FIG. 2 by setting the abscissa of the reciprocal temperature (°R) to the left for a distance of $0.01 \times 10^{-3}$ corresponding to a temperature at about .3° to 3.5°F higher than the average observed temperature of Table 1. This results in a curve IIa having the same slope as curve II with a slight change in the temperature intercepts. The area below the new curve, recommended for practical operation with safeguards for avoiding plume formation, corresponds to the formula:

(IIa) $\log_{10} [pSO_2] \times [pNH_3] \times [pH_2O] \leq (-17{,}300 \times 1/T) + 31.24$ All of the experimental values in Tables 2 and 3 at which appearance of smoke was observed are above the line of curve IIa and confirm that under proper conditions of operation solids formation in the scrubber will not occur when the log of the product of the partial pressures of the components $SO_2$, $NH_3$ and $H_2O$ expressed in mm. Hg falls below the numerical value appearing on the right hand side of Equation IIa above.

In practical application the absorber should be operated at temperatures within the range of 90° to 130°F and preferably at or above 120°F.

In order to assure against appearance of a plume in the vapors discharged from the scrubber stack it is necessary that the log of the product of the partial pressures of $NH_3$, $SO_2$ and $H_2O$ in the vapor phase within the scrubber not exceed the value of the right hand side of Equation IIa in all regions of the scruubber. Moreover care must be observed to avoid a localized condition wherein a small droplet of the aqueous liquid in the scrubber is subjected to a large volume of hot, dry gas with consequent drying of the liquid by rapid vaporization of water and production of solid particulates. To avoid such occurrence at the contact plates and elsewhere in the absorber it is important to presaturate the vapor effluent from the power plant with water before it comes in contact with the ammoniacal scrub liquid. Such saturation is provided for in the system illustrated in FIG. 3 of the accompanying drawings wherein the incoming vapors are water washed at 2 and subjected to further contact with water circulating at the bottom of the scrubber.

In combustion of chloride-containing fuel, such as coal, hydrogen chloride may be present in the fuel gas. In these instances the water washes in FIG. 3 serve an additional purpose of removing HCl, which can form a particulate $NH_4Cl$ plume in the scrubber if the concentration of HCl is greater than about 10 ppm.

It is also important that the selected operating conditions as to temperature be maintained at all regions traversed by the vapor components. Even though over all conditions are employed such that the product of the partial pressures of $NH_3$, $SO_2$ and $H_2O$ does not exceed the constant critical for solids formation at the selected temperature of operation at a given scrubbing stage, it will be appreciated that a solid product could be formed by a local region of significantly lower temperature, such that the equilibrium constant at such lower temperature is exceeded. Such localized cooling could occur, for example between stages of scrubbing, at the wall of the scrubber, in the discharge line to the stack, or at any heat conducting surface the outside of which is in contact with the ambient atmosphere. Accordingly, it is necessary to insulate or heat the wall of the scrubber and such other surfaces where cooling might occur, to maintain the same at substantially the selected operating temperature.

Localized heating or hot zones should also be avoided since the partial pressure of ammonia in the scrubbing liquor increases with temperature and the resultant product of the three partial pressures can exceed the indicated constant at an adjacent cool zone. Such local heating can occur upon condensation of water vapor or by direct heating from sensible heat of hot flue gas.

From the foregoing it will be appreciated that avoidance of plume formation in operation of a scrubber, wherein $SO_2$ flue gas is washed with aqueous ammoniacal liquor, the following conditions must be observed.

(1) Maintain the partial pressures of $SO_2$, $NH_3$ and $H_2O$ at all regions of the scrubber such that the logarithum of the product of their partial pressures does not exceed the critical value set out in Equation IIa at any temperature at any stage of the scrubbing.

(2) Avoid local regions of cooling to a lower temperature or heating to a higher temperature such that the K value, corresponding to a lower temperature, is exceeded. This entails insulation or temperature jacketing of the scrubber wall and of the vapor discharge conduit to the stack. It also entails insuring that the operating temperature of any scrubbing stage does not decrease to the point where the product of the partial pressures of $H_2O$, $SO_2$ and $NH_3$, which is out of the precipitation zone at a higher temperature employed in a prior scrubbing stage, is in the precipitation zone in a subsequent stage.

Hot spots in the scrubbing system should also be avoided. This is achieved by initial cooling of the hot flue gas to a temperature equal to or less than of the initial ammoniacal scrubbing stage and by avoiding condensation of water vapor upon the entry of flue gas to each scrubbing stage.

If proper conditions are maintained within the scrubber and further heating of the vapor effluent is practiced, insulation of the stack itself will not ordinarily be required.

(3) Water scrub hydrogen chloride-containing flue gas to reduce the HCl to less than about 10 ppm.

(4) Even though the conbustion gas contains less than 10 ppm. HCl, it is nevertheless desirable in most instances to treat the gas with water prior to its contact with ammoniacal scrub liquor, so as to presaturate the gas with water.

EXAMPLE

Data is given below applying the described operating principles to a power plant stack gas from burning of coal, the gas having the following composition:

|  | vol.% |
|---|---|
| $SO_2$ | 0.22 |
| $H_2O$ | 7.76 |
| $N_2$ | 74.58 |
| $O_2$ | 4.89 |
| $CO_2$ | 12.55 |

Using an ammonia concentration of 18 mols per 100 mols $H_2O$ in the treating liquor, in a three stage operation, the concentrations of $SO_2$ at the several stages would be (per 100 mols $H_2O$)

| Upper Stage 3 | Middle Stage 2 | Lower Stage 1 |
|---|---|---|
| 11.7 | 12.5 | 14.3 |

Assuming equilibrium operation for formation of ammonium bisulfite in each of the stages at liquid tray temperatures of 105°F, the partial pressures of the components at each of the stages would be as follows:

|  | (mm Hg) $pH_2O$ | $pSO_2$ | $pNH_3$ |  | Product (mm)³ |
|---|---|---|---|---|---|
| Stage 3 | 49 | 0.1 | 0.13 | = | 0.64 |
| Stage 2 | 49 | 0.2 | 0.08 | = | 0.78 |
| Stage 1 | 48 | 0.67 | 0.04 | = | 1.29 |

Figure 2:
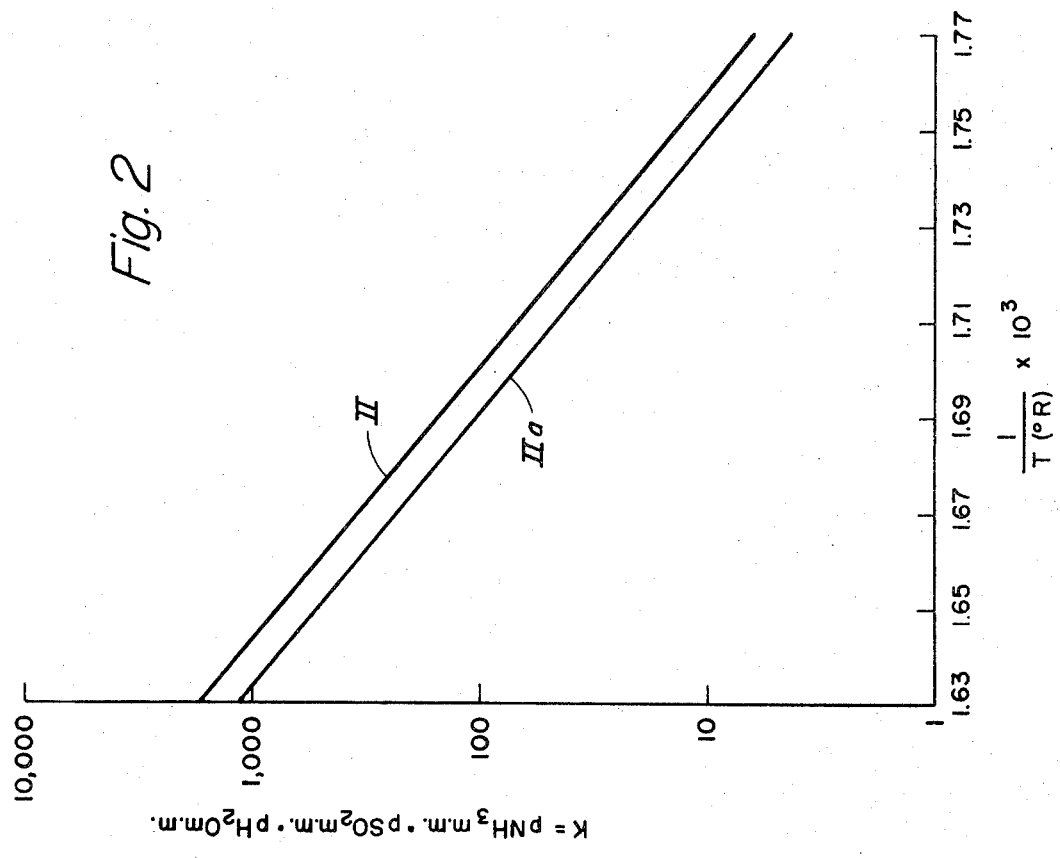
FIG. 2 is a modified form of curve II of FIG. 1.

It will be seen that at each stage the obtained values fall considerably below the curve in FIG. 2, or stated otherwise, the product of the partial pressures falls below the numerical value at the right hand side of equation IIa.

If the operating temperature is raised to 125°F, the corresponding partial pressures of each of the stages would be:

|  | (mm Hg) $pH_2O$ | $pSO_2$ | $pNH_3$ |  | Product (mm)³ |
|---|---|---|---|---|---|
| Stage 3 | 84 | 0.17 | 0.45 | = | 6.47 |
| Stage 2 | 83 | 0.36 | 0.29 | = | 8.7 |
| Stage 1 | 82 | 1.21 | 0.13 | = | 12.9 |

It will be seen that at this temperature the product of the partial pressures at each stage is still well below the defined critical limit, at which the plume would be generated.

While operation of the absorber within the critical limits defined will prevent generation of the plume, it is nevertheless deemed desirable as an added precaution to provide for reheating the exit gas before it enters the stack for the following reasons. In installations in which the stack is not insulated, the additional heat added to the stack gas may compensate any expected adverse temperature drop by heat loss to the atmosphere through the stack wall.

Even in instances in which the designed operation is efficiently maintained at the absorber trays, and no significant drop in temperature occurs in the stack, abnormal atmospheric conditions might create a plume above the stack exit particularly under conditions of low atmospheric temperature and insufficiently rapid dispersion of the gas into the ambient atmosphere. Under these conditions reheating will be beneficial in reducing the possibility of the appearance of the plume above the stack.

Although, as above indicated, a moderate extent of reheating may provide a beneficial additional precaution against appearance of a plume above the stack exit, such reheating alone cannot be relied upon if the absorber is operated at conditions in excess of the defined limits or otherwise favorable to generation of the plume. Once the solid particulate matter constituting the plume has formed to substantial extent, reversion to vapor by further heating is difficult and in any event, residence time in the stack may be insufficient to completely achieve the reverse reaction.

Preferably, reheating of the exit gas should be to about 50°F above the tray liquid temperature or within the range of 35° to 70° F above that tray temperature for further assurance of avoidance of appearance of the plume under most conditions anticipated.

While in the illustrative Examples above, conditions for the absorber were set out at operating temperatures of 105° and 125°F respectively, as heretofore indicated, operation over the wider range of 90° to 130° is contemplated.

What is claimed is:

1. In the scrubbing of combustion gases with aqueous ammoniacal solution for removal of contained sulfur oxides, the improvement which comprises effecting absorption of $SO_2$ by the ammoniacal scrubbing liquor under controlled conditions of concentrations of components at the absorption temperature such that the logarithm (to the base 10) of the product of the partial vapor pressures of $SO_2$, $NH_3$ and $H_2O$ at all regions within the scrubber and prior to discharge of the vapor effluent therefrom into the atmosphere does not exceed the numerical value: $31.24 - (17,300/T)$, wherein the said partial pressures are expressed in millimeters of mercury and T is the Absolute temperature in degrees Rankine.

2. The method as defined in claim 1 wherein the combustion gas is saturated with water vapor prior to its initial contact with ammoniacal scrub liquor.

3. The method as defined in claim 1 wherein the hydrogen chloride content of the combustion gases is reduced to less than about 10 ppm prior to their initial contact with the ammoniacal solution.

4. The improvement as defined in claim 1 wherein said ammoniacal scrubbing liquid comprises ammonium sulfite and ammonium bisulfite.

5. The improvement as defined in claim 1 wherein the absorption of $SO_2$ by the ammoniacal liquid is carried out in several stages and the defined controlled conditions are maintained in all such absorption stages and in all regions traversed by the vapors prior to discharge of the vapor effluent into the atmosphere.

6. The improvement as defined in claim 2 wherein prior to discharge of the vapor effluent into the atmosphere, it is reheated to a temperature in the range of 35° to 70°F above the absorption temperature.

7. The improvement as defined in claim 5 wherein the effluent vapor from the uppermost stage substantially freed of $SO_2$, is reheated to a temperature in the range of 35° to 70°F above absorption temperature of the uppermost stage prior to discharge into the atmosphere.

8. The method of inhibiting the appearance of a plume above the stack exit into which stack there is discharged the residual vapor effluent from removal of sulfur dioxide by aqueous ammoniacal absorption from combustion products originating from the burning of sulfur-containing fuels, which method comprises 1. removing solid particles from the gasiform combustion products, obtaining a substantially solids-free gas,
2. cooling and saturating the solids-free gas to a temperature in the range of 100° – 120°F by water washing, and in so doing reducing the concentration of hydrogen chloride to less that 10 ppm,
3. contacting the cooled gas with aqueous ammoniacal liquor in successive treating stages under controlled conditions such that the concentrations respectively of ammonia, sulfur dioxide and water at the prevailing temperature in all areas of such contact are such that the logarithm (to the base 10) of the product of these partial pressures (expressed in mm Hg) at the temperature prevailing in each such area lies below and to the left of the line graph IIa in FIG. 2 of the accompanying drawings; and reheating the remaining gas after the last said liquid contacting stage to a temperature in the range of about 50°F above the temperature prevailing during the said last liquid contacting stage, prior to discharge of said gas into the atmosphere.

9. The method as defined in claim 1 wherein insulation is provided at the boundaries of at least a portion of the path traversed by the vapor effluent from the scrubber to the atmosphere.

10. The method as defined in claim 1 wherein insulation is provided at least in part at the walls bounding the scrubber.

* * * * *

UNITED STATES PATENT OFFICE
CERTIFICATE OF CORRECTION

Patent No. 3,843,789        Dated October 22, 1974

Inventor(s) Marshall L. Spector and P. L. Thibaut Brian

It is certified that error appears in the above-identified patent and that said Letters Patent are hereby corrected as shown below:

Column 3, line 1    "$m(1/T + b$" should read -- $m(1/T) + b$ --

Column 6, line 63    "30°F" should read -- 3°F --

Column 7, line 44    "the" first occurrence should read --The--

Column 12, line 24    Under Product (mm) 3

"6.47" should read -- 6.4 --

Signed and sealed this 15th day of July 1975.

(SEAL)
Attest:

RUTH C. MASON
Attesting Officer

C. MARSHALL DANN
Commissioner of Patents
and Trademarks